United States Patent [19]

Hunt et al.

[11] Patent Number: 5,462,057
[45] Date of Patent: Oct. 31, 1995

[54] ULTRASOUND IMAGING SYSTEM USING LINE SPLICING AND PARALLEL RECEIVE BEAM FORMATION

[75] Inventors: Thomas J. Hunt, Pelham, N.H.; Benjamin M. Herrick, Boxborough, Mass.; Kimberly K. Robertson, Boxford, Mass.; Karl E. Thiele, Andover, Mass.; J. Mark Ziel, Methuen, Mass.

[73] Assignee: Hewlett-Packard Company, Palo Alto, Calif.

[21] Appl. No.: 287,762

[22] Filed: Aug. 9, 1994

Related U.S. Application Data

[63] Continuation of Ser. No. 254,825, Jun. 6, 1994, abandoned.

[51] Int. Cl.⁶ .......................................................... A61B 8/00
[52] U.S. Cl. ........................................................ 128/661.01
[58] Field of Search ........................ 128/660.07, 661.01, 128/661.09, 661.1; 73/625, 626

[56] References Cited

U.S. PATENT DOCUMENTS

| | | | |
|---|---|---|---|
| 4,140,022 | 2/1979 | Maslak | 73/626 |
| 4,252,026 | 2/1981 | Robinson | 73/626 |
| 4,275,461 | 6/1981 | Sternick et al. | 367/122 |
| 4,359,767 | 11/1982 | Sachs et al. | 367/105 |
| 4,622,634 | 11/1986 | Fidel | 364/414 |
| 4,644,795 | 2/1987 | Augustine | 73/625 |
| 4,670,683 | 6/1987 | 't Hoen | 310/334 |
| 4,790,320 | 12/1988 | Perten et al. | 128/661.01 |
| 4,886,069 | 12/1989 | O'Donnell | 128/661.01 |
| 4,893,283 | 1/1990 | Pesque | 367/7 |
| 4,926,872 | 5/1990 | Brock-Fisher et al. | 128/661.01 |
| 4,949,259 | 8/1990 | Hunt et al. | 364/413.25 |
| 5,027,821 | 7/1991 | Hirama et al. | 128/661.01 |
| 5,105,814 | 4/1992 | Drukarey et al. | 128/660.07 |
| 5,121,361 | 6/1992 | Harrison, Jr. et al. | 367/7 |
| 5,301,168 | 4/1994 | Miller | 367/138 |
| 5,318,033 | 6/1994 | Savord | 128/661.01 |
| 5,322,068 | 6/1994 | Thiele et al. | 128/661.01 |
| 5,329,930 | 7/1994 | Thomas, III et al. | 128/661.01 |
| 5,351,690 | 10/1994 | Okada et al. | 128/661.01 |
| 5,379,642 | 1/1995 | Reckwerdt et al. | 73/625 |

OTHER PUBLICATIONS

David E. Schmieder et al, "A Segmented Aperture Approach to High Resolution NMNW Imaging", Georgia Inst. of Tech., Eng. Exper. Station, TH–4–3.

*Primary Examiner*—Francis Jaworski

[57] ABSTRACT

In a phased array ultrasound imaging system, a high quality image is obtained by a combination of line splicing and parallel receive beamforming. Two transmit pulses, one focused in the near field and one focused in the far field, are transmitted sequentially at each steering angle. The transmitted ultrasound energy is preferably focused both in azimuth and in elevation. Ultrasound echos are simultaneously received along two receive scan lines spaced angularly on opposite sides of each transmit scan line. Signals received in response to the near field and far field transmit pulses are spliced together to provide signals that represent a high quality image throughout the region of interest. Image artifacts are reduced by blending the received signals near the splice between the near field and the far field, by dynamically steering the receive scan lines to reduce the effect of line warping, and by weighted averaging of adjacent scan lines.

15 Claims, 10 Drawing Sheets

ULTRASOUND IMAGING SYSTEM USING LINE SPLICING AND PARALLEL RECEIVE BEAM FORMATION

CROSS REFERENCE TO RELATED APPLICATION

This application is a continuation of application Ser. No. 08/254,825, filed Jun. 6, 1994 and now abandoned.

FIELD OF THE INVENTION

This invention relates to medical ultrasound imaging systems and, more particularly, to medical ultrasound imaging systems which utilize transmit focus splicing and parallel receive beam formation to achieve high image quality.

BACKGROUND OF THE INVENTION

In a phased array ultrasound imaging system, an ultrasound transducer includes an array of transducer elements. The system includes a multiple channel transmitter and a multiple channel receiver connected through a transmit/receive switch to the transducer. Each transmitter channel causes a selected transducer array element to transmit an ultrasound pulse into an object being imaged, typically the human body. The transmitted ultrasound energy is steered along a transmit scan line and is focused by applying appropriate delays to the pulses transmitted from each transducer array element, so that the transmitted energy adds constructively a desired focal point to form a transmit beam. A part of the transmitted ultrasound energy is reflected back to the transducer array by various structures and tissues in the body.

Steering and focusing of the received ultrasound energy are effected in a reverse manner. The reflected ultrasound energy from an object or structure arrives at the array elements at different times. The received signals are amplified and are delayed in separate receiver channels and then are summed in a receive beamformer to form a receive beam. The delay for each channel is selected such that the receive beam is steered at a desired angle and is focused at a desired depth. The delays may be varied dynamically so as to focus the beam at progressively increasing depths along a receive scan line as the ultrasound energy is received. Ultrasound energy is transmitted along multiple transmit scan lines in a desired scan pattern, such as a sector scan, and the received signals are processed as described above to produce an image of the region of interest.

In order to obtain the highest quality image, both the transmit beam and the receive beam should be focused at each point in the area being imaged. However, the time required to obtain an image in this manner would be prohibitive. In most prior art systems, the transmit beam is typically focused at a single focal depth, and the receive beam is dynamically focused only in azimuth, the direction perpendicular to the divisions between elements of the transducer array. For both transmit and receive beams, the elevation focus is typically established by an ultrasound lens mounted on the transducer. As a result, the transmit beam is out of focus at points displaced from the transmit focal point, and the receive beam is out of focus in the elevation direction, except at a fixed focal point. These factors cause portions of the image displaced from the focal points to be degraded in quality.

U.S. application Ser. No. 08/006,084, filed Jan. 19, 1993 and now U.S. Pat. No. 5,301,168 and assigned to the assignee of the present application, discloses an ultrasound transducer having rows and columns of transducer elements. Two or more transmit beams are transmitted at the same steering angle, but at different focal depths. The received signals in the region of each transmit focal point are "spliced" together to form a single receive line at each steering angle. The transmitted beams are focused both in elevation and in azimuth by energizing different apertures of the transducer at different focal depths. Since the spliced receive line is made up of received signals from regions where the transmitted beams are relatively focused, image quality is improved. However, unless special measures are taken, the frame rate of the ultrasound images (the rate at which complete images are generated) is decreased in proportion to the number of beams transmitted at each steering angle. For ultrasound images in cardiac applications, frame rates lower than about 30 frames per second are considered unacceptable.

One way to increase the rate of data acquisition in an ultrasound imaging system is by generating two or more different receive beams simultaneously. This may be accomplished by replicating the beamforming hardware for each additional receive beam. U.S. Pat. No. 4,622,634, issued Nov. 11, 1986 to Fidel, discloses an ultrasound imaging system wherein ultrasound vectors obtained simultaneously are sequentially entered into a scan converter. U.S. Pat. No. 4,926,872, issued May 22, 1990 to Brock-Fisher et al, discloses a color flow imaging system which utilizes parallel processing of color flow scan lines. Parallel processing of received ultrasound information is also disclosed in U.S. Pat. No. 4,644,795 issued Feb. 24, 1987 to Augustine; U.S. Pat. No. 4,790,320 issued Dec. 13, 1988 to Perten et al.; U.S. Pat. No. 5,027,821, issued Jul. 2, 1991 to Hirama et al.; U.S. Pat. No. 4,886,069 issued Dec. 12, 1989 to O'Donnell; U.S. Pat. No. 4,893,283 issued Jan. 9, 1990 to Pesque; U.S. Pat. No. 5,121,361 issued June 9, 1992 to Harrison, Jr., et al.; and U.S. Pat. No. 4,252,026 issued Feb. 24, 1981 to Robinson.

SUMMARY OF THE INVENTION

According to the present invention, an ultrasound imaging system comprises an array of ultrasound transducer elements, a transmitter for transmitting ultrasound energy into a region of interest with the array at a plurality of steering angles, and a receiver for receiving signals generated by the array in response to the ultrasound echoes. For each of the steering angles, the transmitter sequentially transmits ultrasound energy along a near field transmit scan line and a far field transmit scan line at different focal depths. The receiver includes beamforming apparatus for simultaneously receiving signals along first and second near field receive scan lines in response to ultrasound energy transmitted along the near field scan line, and for simultaneously receiving signals along first and second far field receive scan lines in response to ultrasound energy transmitted along the far field transmit scan line. The first near field receive scan line is co-linear with the first far field receive scan line, and the second near field receive scan line is co-linear with the second far field receive scan line. The ultrasound imaging system further includes means for splicing the signals received along the first near field receive scan line and the first far field receive scan line to produce signals representative of a first spliced scan line, and for splicing the signals received along the second near field receive scan line and the second far field receive scan line to produce signals representative of a second spliced scan line. The signals representative of the spliced scan lines are used to generate an image of the region of interest. As a result, signals representative of two spliced scan lines are provided in response to ultrasound energy transmitted along the near field and far field transmit scan lines at each of the steering angles, and the frame rate of the image is not degraded by the transmission of ultrasound energy along two transmit scan lines at each steering angle.

In a preferred embodiment, the array of ultrasound transducer elements includes at least two selectable elevation apertures. In this embodiment, the transmitter includes means for transmitting ultrasound energy along the near field transmit scan line with a first elevation aperture and for transmitting ultrasound energy along the far field transmit scan line with a second elevation aperture that is larger than the first elevation aperture. The receiver preferably includes means for receiving signals along the first and second near field receive scan lines with the first elevation aperture and for receiving signals along the first and second far field receive scan lines with the second elevation aperture. Thus, ultrasound energy transmitted along the near field and far field transmit scan lines is focused, both in azimuth and in elevation.

According to a further feature of the invention, the receiver preferably includes means for dynamically varying the receive angle during reception of the ultrasound echoes to compensate for spatial variations in the transmitted ultrasound energy. Specifically, each of the receive scan lines is steered away from the corresponding transmit scan line near the focal depth of the corresponding transmit scan line to produce a substantially constant effective receive angle.

According to a further feature of the invention, the system includes means for weighted averaging of signals representative of adjacent spliced scan lines to provide averaged scan lines. The weighted averaging of adjacent spliced scan lines compensates for differences in the parallel beamforming channels and for transmitted beam distortions in the region of interest.

According to another aspect of the invention, an ultrasound imaging system comprises an array of ultrasound transducer elements, a transmitter for transmitting ultrasound energy into a region of interest with the array at a plurality of steering angles, and a receiver for receiving signals generated by the array in response to ultrasound echoes. For each of the steering angles, the transmitter transmits ultrasound energy along a transmit scan line. The receiver includes beamforming apparatus for simultaneously receiving signals along first and second receive scan lines in response to ultrasound energy transmitted along the transmit scan line. The ultrasound imaging system further includes means for weighted averaging of signals received along adjacent receive scan lines to provide averaged receive scan lines. The signals representative of the averaged receive scan lines are used to generate an image of the region of interest.

According to yet another aspect of the invention, an ultrasound imaging system comprises an array of ultrasound transducer elements, a transmitter for transmitting ultrasound energy into a region of interest with the array at a plurality of steering angles, and a receiver for receiving signals generated by the array in response to ultrasound echoes. For each of the steering angles, the transmitter transmits ultrasound energy along a transmit scan line. The receiver includes beamforming apparatus for simultaneously receiving signals along first and second receive scan lines in response to ultrasound energy transmitted along the transmit scan line. The receiver includes means for dynamically varying the steering angles of the receive scan lines during reception of the ultrasound echoes to compensate for spatial variations in the ultrasound energy. The signals representative of the receive scan lines are used to generate an image of the region of interest.

BRIEF DESCRIPTION OF THE DRAWINGS

For a better understanding of the present invention, reference is made to the accompanying drawings which are incorporated herein by reference and in which.

DETAILED DESCRIPTION

Figure 1:
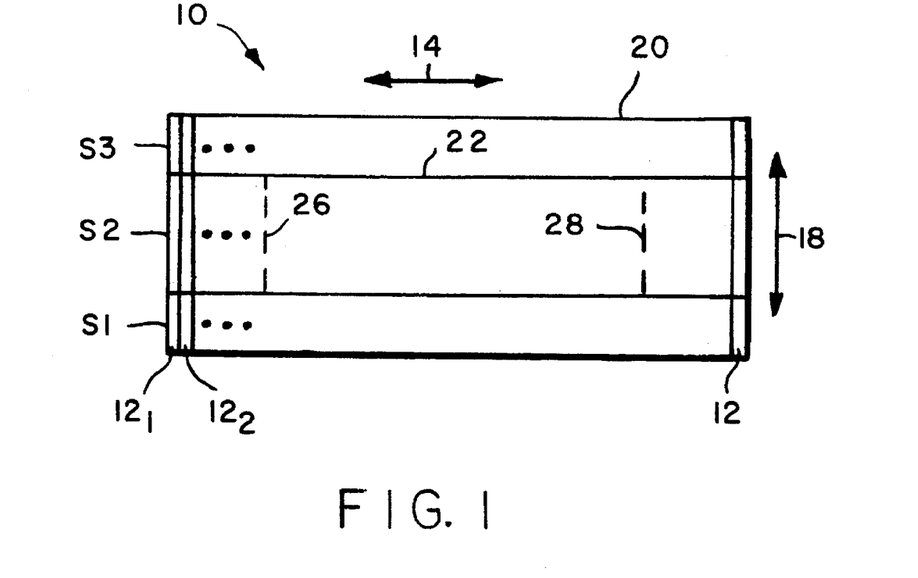
FIG. 1 is a front schematic view of a phased array ultrasound transducer suitable for split elevation focusing.

A phased array ultrasound transducer 10 suitable for implementation of the present invention is shown in FIG. 1. The transducer is divided into transducer elements $12_1$, $12_2$, ... $12_N$ arranged side-by-side in the lateral, or azimuth, direction 14. A typical transducer for a medical ultrasound imaging system may include 64 to 256 elements. In the example of FIG. 1, each transducer element is divided into three segments S1, S2 and S3 in the elevation direction 18. The segments S1 to S3 of each transducer element can be individually activated for transmission and reception of ultrasound energy. Different active apertures of the transducer are activated by selectively enabling different groups of transducer elements and segments. In a preferred embodiment, a far field aperture 20 includes all elements and segments of the transducer 10, both in azimuth and elevation. A near field aperture 22 includes only the segments S2 of the transducer elements in a central portion of the transducer 10 between dashed lines 26 and 28. As described below, the far field aperture 20 is used for transmitting and receiving ultrasound energy in the far field of a region of interest, and the near field aperture 22 is used for transmitting and receiving ultrasound energy in the near field of the region of interest.

Figure 2:
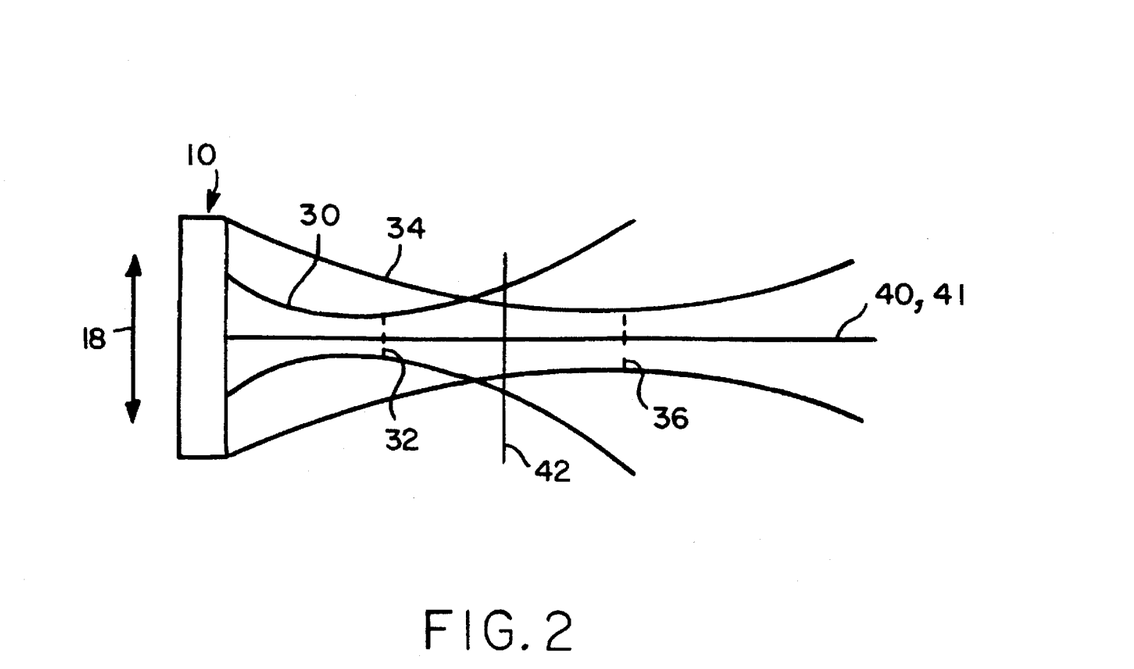
FIG. 2 is a schematic side view of the ultrasound transducer of FIG. 1, illustrating near field and far field transmitted beam patterns.
Figure 3:
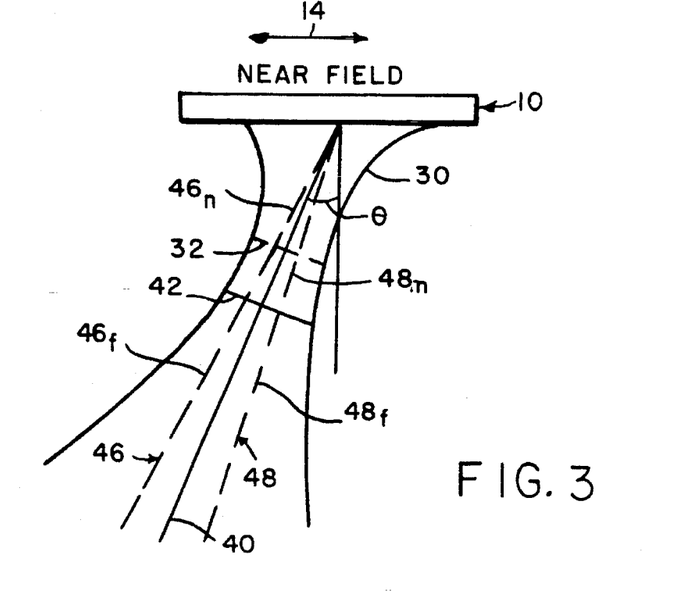
FIG. 3 is a schematic top view of the ultrasound transducer of FIG. 1, illustrating the near field transmitted beam pattern and parallel receive scan lines.
Figure 4:
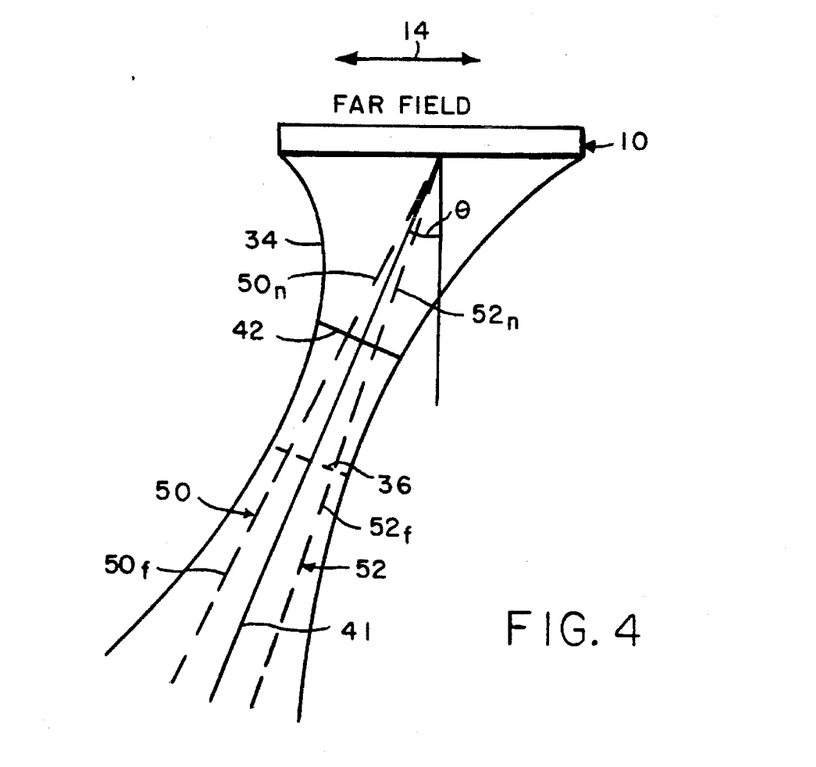
FIG. 4 is a schematic top view of the ultrasound transducer of FIG. 1, illustrating the far field transmitted beam pattern and parallel receive scan lines.

Typical transmit beam patterns for the ultrasound transducer 10 are illustrated in FIGS. 2–4. By appropriately delaying the pulses applied to the transducer elements in the active aperture, as known in the art, the transmitted ultrasound energy is steered in a desired direction with respect to the transducer array and is focused at a desired focal depth. A side elevation view of the transducer 10 is shown in FIG. 2. The near field aperture 22 transmits ultrasound energy having a beam pattern 30 focused in the near field at a focal depth 32. The far field aperture 20 transmits ultrasound energy having a beam pattern 34 focused in the far field at a focal depth 36. Top views of the beam patterns 30 and 34 are shown in FIGS. 3 and 4, respectively. Each beam pattern is steered at an angle θ with respect to a normal to the transducer 10. In order to form transmit beam patterns 30 and 34, each transducer element in the active aperture is energized with a pulse having a delay selected to focus the transmitted ultrasound energy at the focal depth 32 or 36 and to steer the transmitted ultrasound energy at the angle θ. The near field beam pattern 30 can be represented as a transmit scan line 40, and the far field beam pattern 34 can be represented as a far field transmit scan line 41. The near field and far field transmit scan lines 40 and 41 are co-linear, originate at the center of the active aperture of transducer 10 and have an angle θ in the azimuth direction 14 with respect to a normal to transducer 10.

The transmitted ultrasound energy produces ultrasound echoes from various structures in the region of interest. The ultrasound echoes are received by the transducer 10 and are converted to electrical signals. By appropriate phasing of the received signals in a beamformer, a receive beam is formed. The receive beam is steered at a desired steering angle and is dynamically focused at progressively increasing depths as ultrasound echoes are received, so that the receive beam remains in focus as echoes are received from progressively increasing depths.

With reference to FIGS. 3 and 4, it can be seen that beam pattern 30 is focused in the near field and is relatively broad in the far field. Conversely, beam pattern 34 is focused in the far field and is relatively broad in the near field. An arbitrary boundary 42 located between focal depths 32 and 36 separates the near field and the far field. That is, the near field extends from the transducer 10 to boundary 42, and the far field extends from boundary 42 to the desired maximum imaging depth. It will be understood that the boundary 42 will vary in depth depending on the locations of the focal depths 32 and 36.

The beam patterns shown in FIGS. 3 and 4 are transmitted at a plurality of steering angles to form a desired scan pattern, and the received signals are processed as described below to produce signals for generating an image of the region of interest. The ultrasound image quality is improved in comparison with conventional imaging techniques by a technique known line splicing. The transducer 10 is used to transmit ultrasound energy along transmit scan line 40, with the transmitted energy having near field beam pattern 30, as shown in FIG. 3. The signals received in response to the near field beam pattern are stored. Then ultrasound energy is transmitted along transmit scan line 41 with the transmitted energy having far field beam pattern 34, as shown in FIG. 4. The signals received in response to the far field beam pattern are also stored. Then, the signals received from the near field in response to near field beam pattern 30 are combined, or spliced, with the signals received from the far field in response to far field beam pattern 34. The result is a spliced signal which provides high image quality, both in the near field and in the far field, because all received signals are obtained from regions where the transmitted ultrasound energy is relatively focused.

The procedure of transmitting the near field beam pattern and the far field beam pattern, receiving the signals produced by each transmitted beam pattern and splicing the received signals together to produce a spliced signal of high image quality is repeated for a plurality of steering angles to provide a desired scan pattern, such as a sector scan pattern. For example, a sector scan pattern may cover a 90° sector. While the line splicing technique produces high image quality, both in the near field and in the far field, the frame rate (the rate at which complete images are generated) is reduced by a factor of two in comparison with conventional scanning techniques, because near field and far field beam patterns are transmitted at each steering angle.

In accordance with an important aspect of the invention, the frame rate reduction that occurs in line splicing is offset, either partially or completely, by receiving simultaneously along two or more receive scan lines that are angularly spaced from the transmit scan line. Referring to FIG. 3, ultrasound echoes are simultaneously received along near field receive scan lines 46 and 48 in response to ultrasound energy transmitted along near field transmit scan line 40. With reference to FIG. 4, ultrasound echoes are simultaneously received along far field receive scan lines 50 and 52 in response to ultrasound energy transmitted along far field transmit scan line 41. The receive scan lines 46, 48, 50 and 52 represent receive beam patterns (not shown in FIGS. 3 and 4). The simultaneous receive scan lines 46, 48 and 50, 52 are angularly spaced from the respective transmit scan lines by a relatively small angle selected such that the receive scan lines are within the beam patterns of the transmitted ultrasound energy. Preferably, the simultaneous receive scan lines 46, 48 and 50, 52 are spaced from the respective transmit scan lines by equal and opposite angles of about 1° or less. The near field receive scan line 46 is co-linear with far field receive scan line 50, and near field receive scan line 48 is co-linear with far field receive scan line 52, to permit line splicing as described below.

As described above, the near field transmit beam pattern 30 is focused in a near field region between transducer 10 and boundary 42, and far field transmit beam pattern 34 is focused in a far field region beyond boundary 42. Thus, the near field receive scan lines 46 and 48 provide high image quality in the near field region, and far field receive scan lines 50 and 52 provide high image quality in the far field region. The respective near field and far field receive scan lines are spliced to provide two spliced scan lines, each having high image quality throughout the region of interest. As shown in FIG. 3, near field receive scan line 46 includes a near field segment $46_n$ and a far field segment $46_f$, and near field receive scan line 48 includes a near field segment $48_n$ and a far field segment $48_f$. Similarly, with reference to FIG. 4, far field receive scan line 50 includes a near field segment $50_n$ and a far field segment $50_f$, and far field scan line 52 includes a near field segment $52_n$ and a far field segment $52_f$. Signals received along the near field segment $46_n$ of receive scan line 46 are combined with signals received along the far field segment $50_f$ of receive scan line 50 to provide a first spliced scan line. Signals received along the near field segment $48_n$ of receive scan line 48 are combined with signals received along the far field segment $52_f$ of receive scan line 52 to provide a second spliced scan line. The signals along the two spliced scan lines are taken from regions where the transmitted ultrasound energy is relatively focused and provide high image quality throughout the region of interest. Furthermore, since two spliced scan lines are obtained for each set of near field and far field transmit scan lines, the frame rate of the ultrasound image is not decreased in comparison with conventional ultrasound imaging. The signals from the far field segments $46_f$ and $48_f$ of near field receive scan lines 46 and 48 and the signals from the near field segments 50$_n$ and 52$_n$ of far field receive scan lines 50 and 52 are not used and can be discarded.

Figure 5:
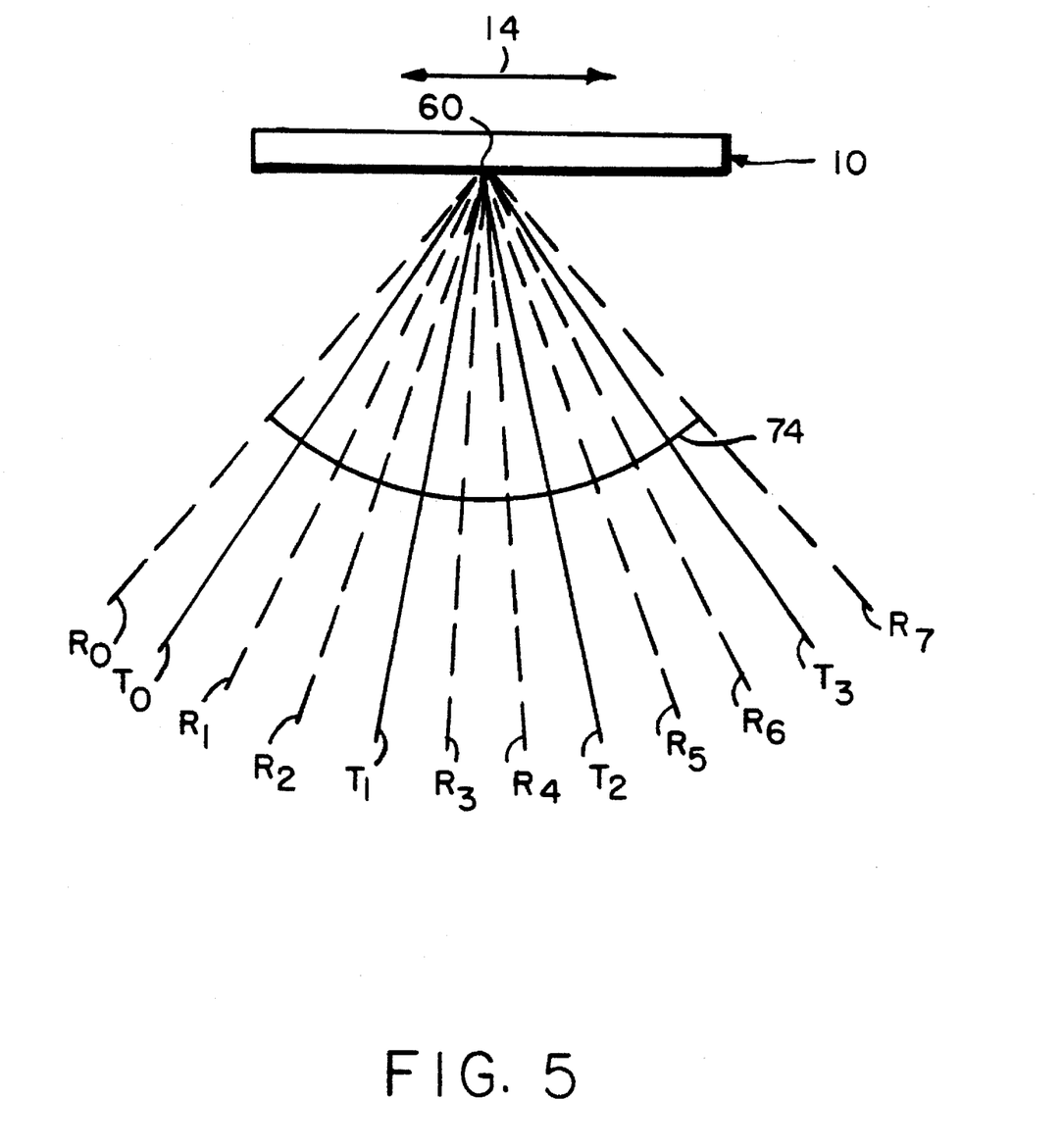
FIG. 5 is a top schematic view of the ultrasound transducer of FIG. 1, illustrating the sector scan pattern of the present invention.

A sector scan pattern in accordance with the present invention is illustrated in FIG. 5. Transmit scan lines are indicated by solid lines emanating from an origin 60 at the center of ultrasound transducer 10, and receive scan lines are indicated by dashed lines emanating from origin 60. An arc 74 defines the boundary between the near field and the far field. Pulsed ultrasound energy focused in the near field is transmitted along transmit scan line T$_o$, and ultrasound echoes are simultaneously received along receive scan lines R$_o$ and R$_1$ as described above. The receive scan lines R$_o$ and R$_1$ are preferably spaced from transmit scan line T$_o$ by equal and opposite angles in the lateral direction 14. Then, pulsed ultrasound energy focused in the far field is transmitted along transmit scan line T$_o$, and ultrasound echoes are simultaneously received along receive scan lines R$_o$ and R$_1$. The transmit scan line T$_o$ corresponds to the transmit scan lines 40 and 41 shown in FIGS. 3 and 4, the receive scan line R$_o$ corresponds to the receive scan lines 46 and 50, and the receive scan line R$_1$ corresponds to the receive scan lines 48 and 52. The received signals are processed as described above to provide two spliced scan lines. Then, the steering angle is changed and ultrasound energy is transmitted along a transmit scan line T$_1$. A first transmitted ultrasound pulse is focused in the near field, and a second transmitted ultrasound pulse is focused in the far field. For each transmitted pulse, ultrasound echoes are simultaneously received along receive scan lines R$_2$ and R$_3$, which are angularly spaced from transmit scan line T$_1$. The received signals are spliced to provide spliced scan lines. The process is repeated for a plurality of additional transmit scan lines T$_2$, T$_3$, . . . and corresponding pairs of receive scan lines R$_4$, R$_5$; R$_6$, R$_7$; . . . angularly spaced from the respective transmit scan lines. While only a few transmit scan lines and receive scan lines are shown in FIG. 5, a sector scan pattern in accordance with the present invention may, for example, include 122 transmit scan lines and 242 receive scan lines and cover a 90° sector. In this example, the transmit scan lines have an angular spacing of 1.5°, and the receive scan lines have an angular spacing of 0.75°.

From the above example and from FIG. 5, it can be seen that the number of transmit scan lines is one-half the number of receive scan lines. Thus, despite the fact that ultrasound pulses are transmitted twice in succession at each steering angle, the number of transmit steering angles is reduced by one-half. Thus, the frame rate is the same as in prior art ultrasound imaging systems having one transmit scan line and one receive scan line at each steering angle. However, the image quality is improved in comparison with such prior art systems because of the line splicing technique described above.

Figure 6:
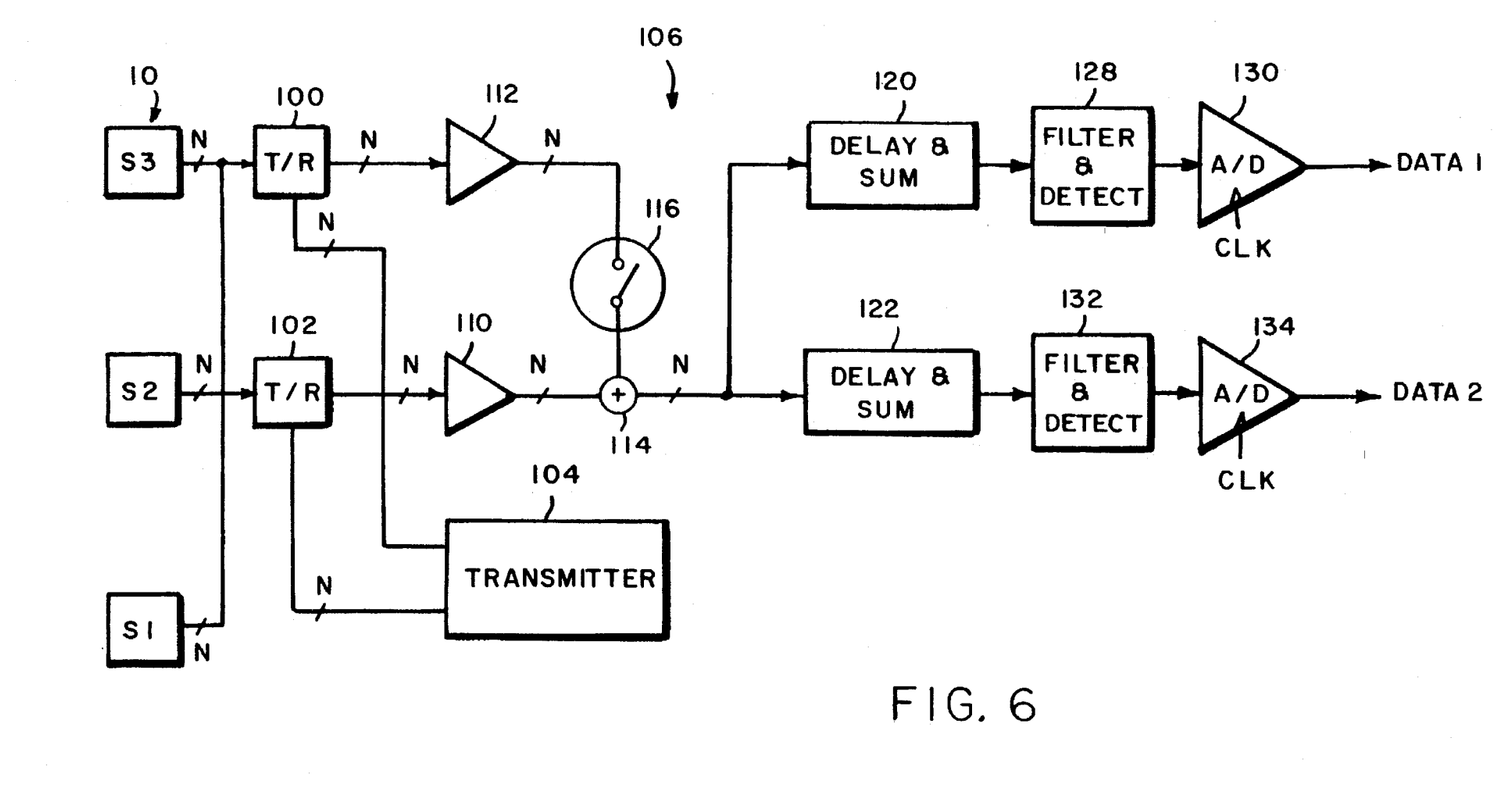
FIGS. 6 and 7 are block diagrams of an ultrasound imaging system in accordance with the present invention.

A block diagram of an ultrasound imaging system suitable for implementation of the scanning technique described above is shown in FIGS. 6 and 7. Referring to FIG. 6, each of the N transducer elements of the ultrasound transducer 10 has segments S1, S2 and S3. Thus, the transducer 10 includes 3N individual segments. As shown in FIG. 6, segments S1 and S3 of each transducer element are connected together and are connected to a transmit/receive switch 100. Segment S2 of each transducer element is connected to a transmit/receive switch 102. As known in the art, the transmit/receive switches 100 and 102 switch between the transmitter and the receiver in accordance with the operating mode and protect the receiver during transmission of ultrasound energy. The transmit/receive switches 100 and 102 are connected to an ultrasound transmitter 104 and to an ultrasound receiver 106. It will be understood that the transmit/receive switch 100 includes N individual switches and that the transmit/receive switch 102 includes N individual switches. Thus, each interconnection between the transducer 10, the transmit/receive switches 100, 102, the receiver 106 and the transmitter 104 includes N individual lines.

During transmission of ultrasound energy, the transmit/receive switches 100 and 102 connect the transmitter 104 to the elements of the ultrasound transducer 10. When ultrasound energy is transmitted along the near field transmit scan line 40, as shown in FIG. 3, only the segments S2 of the near field aperture 22 (FIG. 1) are activated by the transmitter 104. The pulses applied to the individual segments S2 by the transmitter 104 are appropriately delayed to steer the transmitted ultrasound energy at a desired steering angle and to focus the transmitted ultrasound energy at a desired focal depth in the near field. Techniques for delaying signals applied to ultrasound transducer elements to effect steering and focusing are known in the art and will not described in detail. When ultrasound energy is transmitted along the far field transmit scan line 41, as shown in FIG. 4, the transmitter 104 activates all of the segments S1, S2 and S3 of far field aperture 20 (FIG. 1). Pulses applied to the transducer elements are delayed to steer the transmitted ultrasound energy at the desired steering angle and to focus the ultrasound energy at the desired focal depth in the far field. In the far field, the pulses applied to segments S1, S2 and S3 of each transducer element are delayed to focus the transmitted ultrasound energy in the elevation direction as well as the lateral direction. For each steering angle, the transmitter 104 transmits an ultrasound pulse focused in the near field, waits for reception of echoes by the receiver 106, transmits an ultrasound pulse focused in the far field and again waits for reception of ultrasound echoes by the receiver 106. The process is repeated for a plurality of steering angles to provide a desired scan pattern as described above.

Following each transmission of ultrasound energy by the ultrasound transducer 10 and the transmitter 104, ultrasound echoes are received from various structures and tissues in the region of interest. The ultrasound echoes are received by the segments S1, S2 and S3 of each transducer element and are converted to electrical signals. During the receive mode, the transmit/receive switches 100 and 102 connect the transducer elements to receiver 106. More specifically, segment S2 of each transducer element is connected via transmit/receive switch 102 to a preamplifier 110. Segments S1 and S3 of each transducer element are connected together and are connected via transmit/receive switch 100 to the input of a preamplifier 112. It will be understood that one preamplifier 110 is provided for each of the N transducer elements, and one preamplifier 112 is provided for each of the N transducer elements. The output of each preamplifier 110 is connected to a summing unit 114. One summing unit 114 is provided for each of the N transducer elements. The output of each preamplifier 112 is connected through a near/far switch 116 to a second input of summing unit 114. When the receiver 106 is receiving signals following transmission of ultrasound energy focused in the near field, the near/far switch 116 is open and only received signals from segments S2 contribute to the output of summing unit 114. When the receiver 106 is receiving signals following transmission of ultrasound energy focused in the far field, the near/far switch 116 is closed, and the received signals from segments S1, S2 and S3 of each transducer element are added to provide the output of summing unit 114. As described above, the near field aperture 22 shown in FIG. 1 includes only segments S2, and far field aperture 20 includes segments S1, S2 and S3.

The outputs of summing unit 114 are input to a first delay and sum unit 120 and to a second delay and sum unit 122. It will be understood that each of the delay and sum units 120 and 122 receives N individual received signals, one corresponding to each element of ultrasound transducer 10. Each channel of the delay and sum units 120 and 122 delays the received signal by an amount that is selected to form a receive beam. The delays are selected to steer the receive beam to a desired steering angle and to focus the received beam at a desired focal depth. The focal depth is dynamically varied during reception of ultrasound energy at progressively increasing depths. The selectively delayed signals are summed to provide a signal representative of the received signal along a prescribed receive scan line. The delay and sum units 120 and 122 thus function as parallel receive beamformers. The construction of beamformers to effect steering and dynamic focusing of a receive beam is known in the art and will not be described in detail.

The parallel connection of delay and sum units 120 and 122 permits simultaneous, or parallel, reception of ultrasound echoes along two different receive scan lines. For example, with reference to FIG. 3, the delay and sum units 120 and 122 simultaneously receive signals along receive scan lines 46 and 48, respectively. Similarly, with respect to FIG. 4, the delay and sum units 120 and 122 simultaneously receive signals along receive scan lines 50 and 52, respectively. The output of delay and sum unit 120 is connected through a filter and detector 128 to an analog-to-digital converter (ADC) 130. The output of delay and sum unit 122 is connected through a filter and detector 132 to an analog-to-digital converter 134. The outputs of ADC's 130 and 134, DATA 1 and DATA 2, are streams of data words representative of simultaneously received signals along two receive scan lines.

Figure 7:
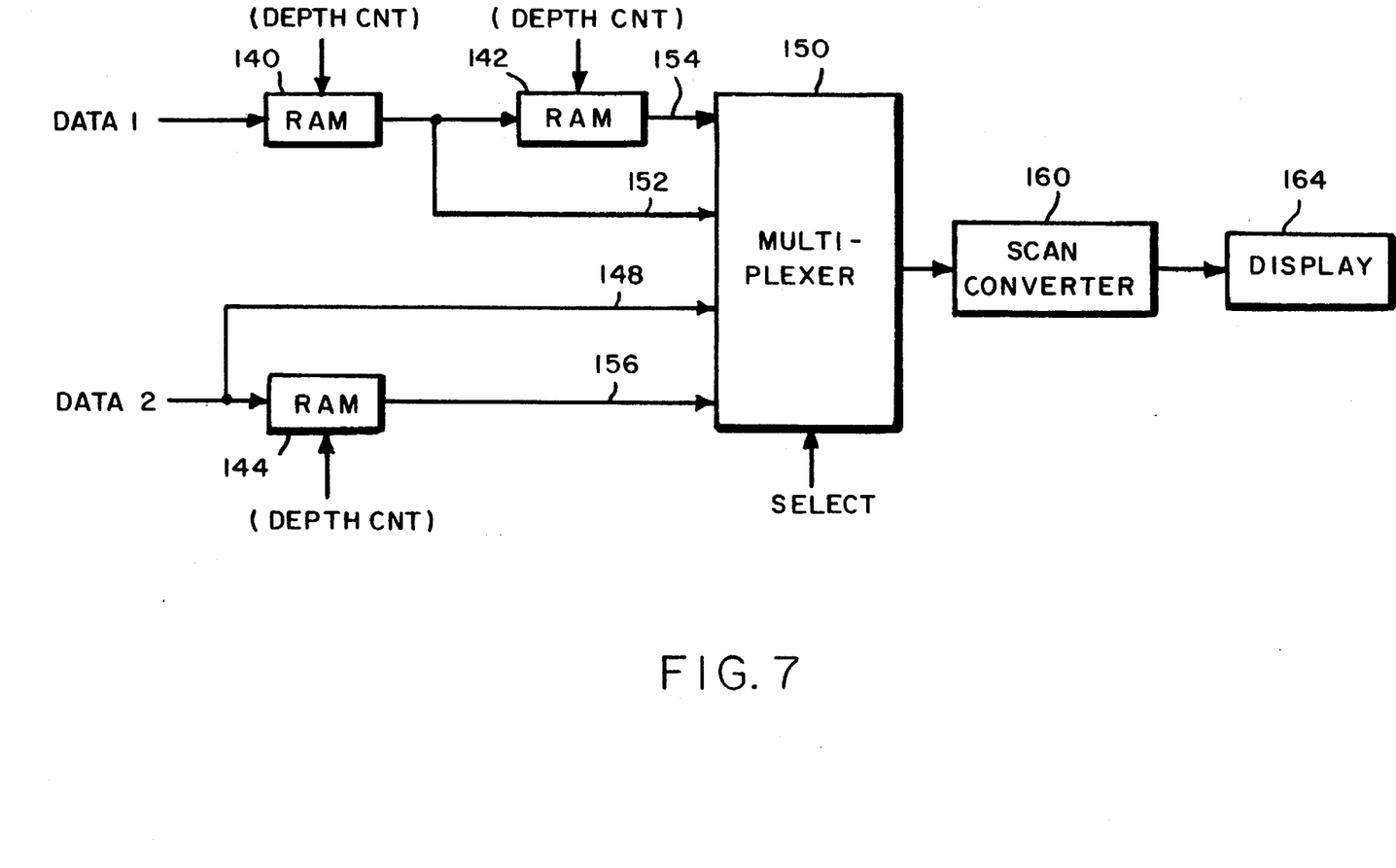

Referring now to FIG. 7, the DATA 1 output of ADC 130 is supplied to a random access memory (RAM) 140 and RAM 142. The DATA 2 output of ADC 134 is supplied to a RAM 144 and to an input 148 of a multiplexer 150. The outputs of RAM's 140, 142 and 144 are connected to inputs 152, 154 and 156, respectively, of multiplexer 150. The RAM's 140, 142 and 144 are addressed for writing by a depth count signal, which is initiated upon transmission of ultrasound energy by transducer 10. The depth count signal establishes a depth within the region of interest corresponding to each data word. The multiplexer 150 receives a select signal which selects one of its inputs for application to a scan converter 160. The scan converter 160 converts the sector scan data to a raster scan format suitable for display on a display unit 164, such as a TV monitor.

Figure 8:
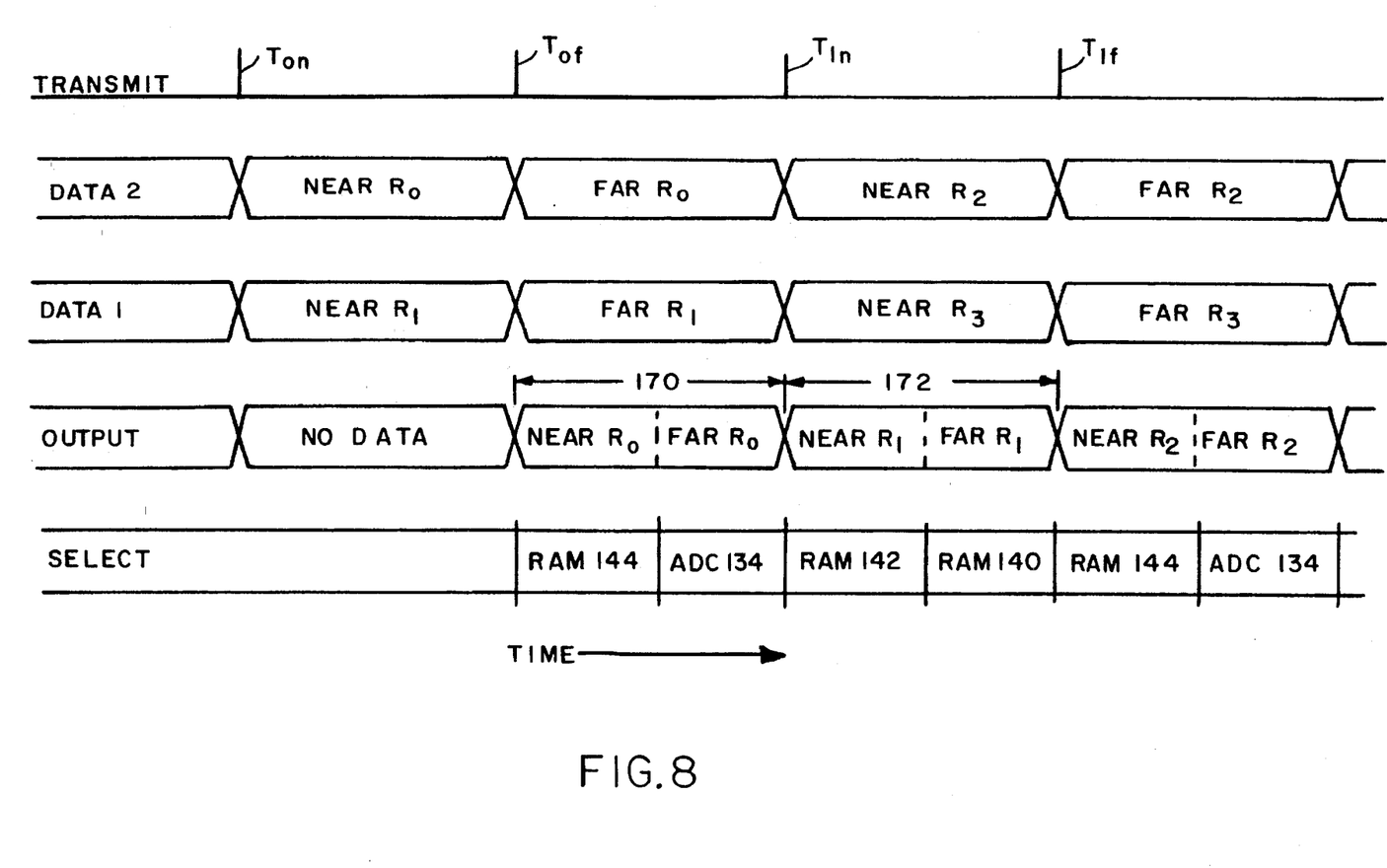
FIG. 8 is a timing diagram that illustrates operation of the system shown in FIGS. 6 and 7.

The RAM's 140, 142 and 144, and the multiplexer 150 perform the function of line splicing and convert the data streams from ADC's 130 and 134 into a single data stream representative of a high quality ultrasound image. The operation of the circuit of FIG. 7 is described with reference to the timing diagram of FIG. 8. Time is displayed on the horizontal axis of FIG. 8. The transmit timing in FIG. 8 shows the timing of transmission of ultrasound energy along transmit scan lines $T_o$ and $T_1$ (FIG. 5). A near field ultrasound pulse $T_{on}$ is transmitted along transmit scan line $T_o$. The near field data for the receive scan line $R_o$ is stored in RAM 144, and the near field data for receive scan line $R_1$ is simultaneously stored in RAM 142. Then, a far field ultrasound pulse $T_{of}$ is transmitted, and far field data for receive scan line $R_o$ is input directly to multiplexer 150, and far field data for receive scan line $R_1$ is input to RAM 140. A RAM is not necessary for storage of the far field data for receive scan line $R_o$, because this data is output in real time to the scan converter 160. The process is repeated for transmission of near field and far field ultrasound pulses $T_{1n}$ and $T_{1f}$ along transmit scan line $T_1$. The near field data for receive scan line $R_2$ is stored in RAM 144, and the near field data for receive scan line $R_3$ is stored in RAM 142. The far field data for receive scan line $R_2$ is input directly to multiplexer 150, and the far field data for receive scan line $R_3$ is stored in RAM 140. This process is repeated for all of the transmit scan lines in the scan pattern.

The readout of data from the RAM's 140, 142 and 144 to effect line splicing is as follows. The output signal shown in FIG. 8 represents the output of multiplexer 150. The select signal selects one of the inputs of multiplexer 150. During the first time interval following transmission of the near field pulse $T_{on}$ along transmit scan line $T_o$, no data is output by multiplexer 150 because far field data is not available for line splicing. Subsequently, each receive interval following transmission of ultrasound energy is divided into a near field part and a far field part, which are not necessarily equal in time. During the first part of the time interval following transmission of the far field pulse $T_{of}$ along transmit scan line $T_o$, the select signal selects the output of RAM 144, and successive locations in RAM 144 are addressed. The output represents the near field portion of the received signal along receive scan line $R_o$. During the second part of the same interval, the select signal selects the output of ADC 134. The data stream from ADC 134 represents the far field portion of receive scan line $R_o$. Thus, the output of multiplexer 150 during this time interval represents a splicing of the near field data for receive scan line $R_o$ (received following transmission of near field pulse $T_{on}$) and the far field data for receive scan line $R_o$ (received following transmission of far field pulse $T_{of}$). The spliced data provides high image quality throughout the region of interest.

During the next time interval following the transmission of the near field ultrasound pulse $T_{1f}$ along transmit scan line $T_1$, the output of RAM 142 is selected during the first part of the time interval, and the output of RAM 140 is selected during the second part of the time interval. The spliced data includes the near field data for receive scan line $R_1$ (received following transmission of near field pulse $T_{on}$) and the far field data for receive scan line $R_1$ (received following transmission of far field pulse $T_{of}$). The process is repeated for each transmit scan line in the scan pattern.

From FIG. 8 it can be seen that the transmission of near field and far field pulses $T_{on}$ and $T_{of}$ along transmit scan line $T_o$ produces spliced output data 170 representative of signals received along receive scan line $R_1$, and spliced output data 172 representative of signals received along receive scan line $R_1$. Each set of output data 170, 172 includes a near field portion and a far field portion. Both sets of output data 170, 172 represent spliced scan lines and generate high quality images. Thus, for every two transmitted pulses, two spliced scan lines of high image quality are generated, and the frame rate is not degraded.

Several additional features can be used to further enhance the ultrasound image generated by the ultrasound imaging system shown in FIGS. 6 and 7 and described above. An abrupt transition between near field data and far field data at the point where the near field data and the far field data are spliced together may produce an image artifact at the boundary between the near field and the far field. This image artifact may be overcome by blending the near field and far field data in a transition region near the boundary. The blending may be effected by weighted averaging of the near field and far field data for a selected number of clock intervals before and after the boundary, as shown by way of example in Table 1 below. Table 1 illustrates weighting factors applied to the near field data and the far field data for several clock intervals preceding and following the boundary. The time is represented by the number of clock intervals before or following the boundary B. Thus, for example, B-2 represents two clock intervals preceding the boundary B. As the boundary B is approached, the weighting of the near field data is decreased from 1.0 to 0 over several clock intervals. During the same clock intervals, the weighting of the far field data is increased from 0 to 1.0. This produces a near field to far field transition that is not noticeable in the ultrasound image. It will be understood that the number of clock intervals over which the blending is performed, and the weighting factors during each clock interval can be varied as necessary.

TABLE I

| Clock Interval | Near field weighting factor | Far field weighting factor |
| --- | --- | --- |
| B-2 | 1.0 | 0 |
| B-1 | 0.75 | 0.25 |
| B | 0.5 | 0.5 |
| B + 1 | 0.25 | 0.75 |
| B + 2 | 0 | 1.0 |

A second enhancement is described with reference to FIG. 3. As described previously, the receive scan lines 46 and 48 are angularly spaced from the transmit scan line 40. In general, the received signal strength and effective angle depends, not only on the receive beam pattern, but also on the transmit beam pattern 30. In regions displaced from the focal depth 32 of the transmit beam pattern 30, the transmit beam pattern 30 is relatively uniform along the receive scan lines and does not significantly alter the effective steering angle of the receive beam. However, in the vicinity of the focal depth 32, the transmit beam pattern 30 is relatively narrow in cross section, and both the transmit and receive beam patterns determine the effective receive angle. This causes the effective receive angle to vary with depth and, unless compensating measures are employed, the ultrasound image is potentially distorted. It is therefore desirable to employ dynamic steering of the receive scan lines during reception of ultrasound echoes to compensate for the above-described effect. In order to avoid confusion and to differentiate from the receive beam pattern established by the receiver beamformer alone, the term "round trip" scan line is used to represent the composite beam pattern that results from the transmit beam pattern and the receive beam pattern.

Figure 9:
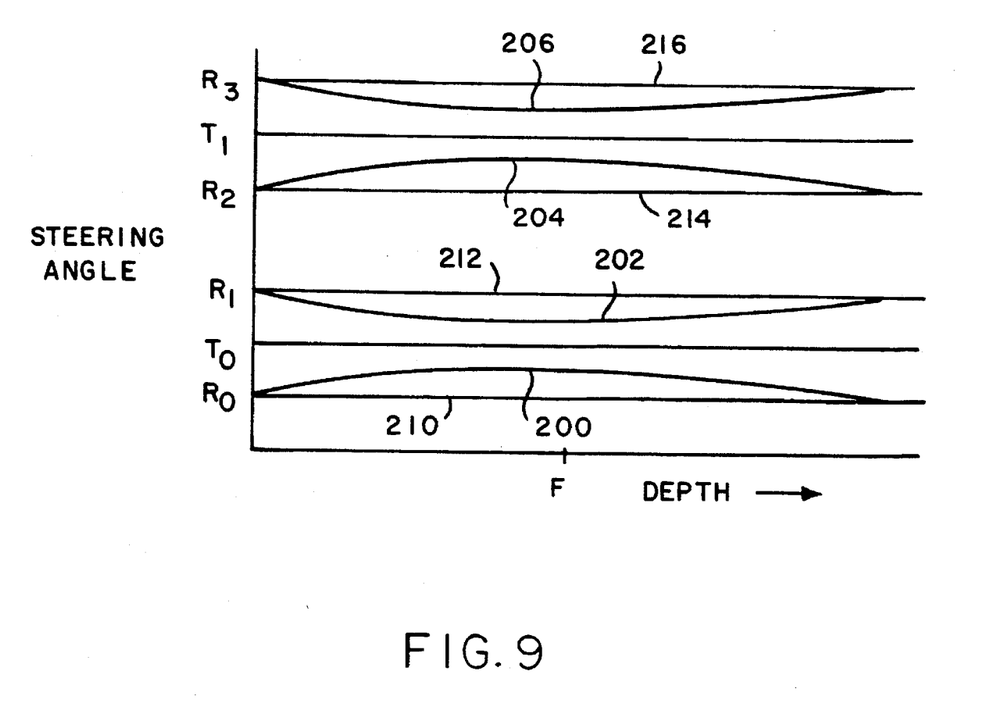
FIG. 9 is a graph of steering angle as a function of depth that illustrates warping of receive scan lines.

The warping of round trip scan lines in the vicinity of the transmit focal depth is illustrated in FIG. 9. In FIG. 9, steering angle is plotted as a function of depth. In the absence of dynamic steering of the receive scan lines, round trip scan lines 200 and 202 are effectively warped toward transmit scan line $T_0$ in the vicinity of transmit focal depth F. Similarly, in the absence of dynamic steering, round trip scan lines 204 and 206 are warped toward transmit scan line $T_1$. In order to avoid image artifacts, the round trip scan lines should have a constant steering angle as a function of depth, as indicated by dashed lines 210, 212, 214 and 216 in FIG. 9. To compensate for the warping of the round trip scan lines illustrated in FIG. 9, the receive scan lines are dynamically steered during reception so that the round trip scan lines have a substantially constant effective receive angle. With reference to FIG. 9, a negative steering angle offset is applied to receive scan line $R_0$ and a positive steering angle offset is applied to receive scan line $R_1$. The required steering angle offset for receive scan line $R_0$ is equal to the difference between curve 200 and curve 210 at each depth. In practice, the steering angle offsets are preferably varied on a zone-by-zone basis by varying the delays in the delay and sum units 120 and 122. Typically, the maximum steering angle offset of the receive scan lines is about $3/8°$ at the transmit focal depth to provide a substantially constant effective receive angle. A technique for dynamic steering of receive scan lines is disclosed in application Ser. No. 08/065,958, filed May 21, 1993 and now U.S. Pat. No 5,322,068, which is hereby incorporated by reference. A delay coefficient generator for determining delay coefficients on a zone-by-zone basis during dynamic focusing is disclosed in U.S. Pat. No. 4,949,259, issued Aug. 14, 1990 to Hunt et al, which is hereby incorporated by reference.

A third enhancement is described with reference to FIG. 5. Any variations between the received signals along adjacent receive scan lines, such as receive scan lines $R_o$ and $R_1$, are easily detected in the ultrasound image. Variations as small as ¼ dB cause a beat pattern (high/low, high/low, etc.) in the ultrasound image, which detracts from the underlying clinical information. These variations can occur due to the fact that the parallel processing channels of the receiver 106 are not identical. The variations in the receive scan lines can also result from acoustics in the human body. The transmit beam and the parallel receive beams may be distorted in different ways by structures in the region of interest, such that the simultaneous receive scan lines are asymmetrical. Variations in the processing channels can be addressed by adjustment of the parallel beamformers or by using adaptive techniques. Receive scan line variations due to acoustics in the body are more difficult to address.

The following technique can be used to minimize or eliminate line-to-line variations independent of the source of the variation. After a frame of received data is detected and stored, a line averaging circuit is used to combine every adjacent receive scan line, such that each receive scan line has a predetermined weight. This is essentially a two point digital FIR filter run along the data in the lateral direction. The greatest filtering, and hence the greatest rejection of line-to-line artifact, occurs when the weights are equal (½, ½). The problem with equal weights is that the image data is low pass filtered, and lateral resolution is lost. There are two ways that lateral resolution can be retained. In one approach, weights that are unequal, for example (A, 1-A), tend to smear the image data less than equal weights. However, the unequal weights also have less rejection of the image artifact. For example, weights of ⅝ and ⅜ reject the artifact by 10 dB, whereas equal weights have infinite rejection. Nevertheless, 10 dB rejection has been proven adequate. In a second approach, line density can be increased such that lateral resolution is preserved. Normally, increasing the line density causes an unacceptable degradation in frame rate. However, since parallel processing, as described above, doubles the frame rate, some of the extra time can be used for transmitting additional lines. For example, a reduction of transmit scan line spacing from 1.5° to 1.25° and a reduction of receive scan line spacing from 0.75° spacing to 0.625° spacing has produced acceptable results.

Since it is known that scan conversion ultimately limits lateral resolution, this fact can be taken into account such that resolution is preserved without doubling the line density. If scan conversion bandwidth limitations were not taken into account, and if equal weights (½, ½) were used to average data, then the line density would have to double to preserve lateral resolution. This would defeat the purpose of parallel processing. However, assuming a scan conversion model which performs linear interpolation and assuming the use of (⅝, ⅜) weighting, the line density is only required to increase by 30 percent to preserve the same lateral resolution.

In a preferred embodiment, weights of ⅝ and ⅜ are used with the reduced line spacing described above. Thus, with reference to FIG. 5, averaged scan lines are obtained as follows. Line A=⅝ (line $R_o$)+⅜ (line $R_1$); Line B=⅝ (line $R_1$)+⅜ (line $R_2$); etc.

The averaging of data as described above shifts the location of the scan lines. For example, the averaging of two adjacent scan lines using equal weights results in an effective scan line positioned directly between the original two lines. This shift can be compensated for in the beamformer by shifting all of the scan lines to the left by one-half of the line spacing or in the scan converter by drawing the scan lines to the right by one-half of the line spacing.

The averaging of data also eliminates one scan line. Thus, if the beamformer generates 100 scan lines, there will be only 99 scan lines after averaging. This can be addressed by generating one more line in the beamformer or by drawing one less line in the scan converter.

The averaging of data in a parallel processing configuration has been described in connection with a sector scan pattern. The approach also applies to parallel color flow imaging, parallel integrated backscatter imaging, use on curved linear arrays and linear array transducers and use in conjunction with virtual apex modes.

Figure 10:
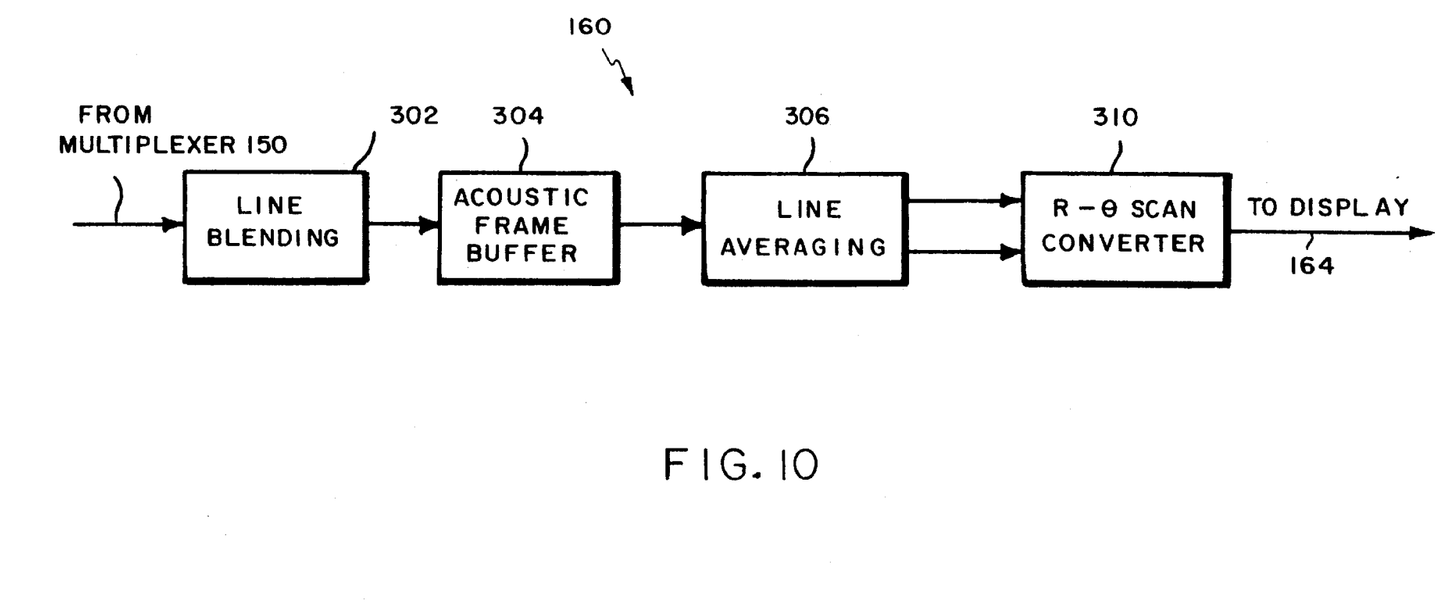
FIG. 10 is a block diagram of the scan converter shown in FIG. 7.

A block diagram of the scan converter 160 shown in FIG. 7 is illustrated in FIG. 10. The output of multiplexer 150 (FIG. 7) is supplied to a line blending unit 302 which performs blending at the transition between the near and far fields as described above. The output of the line blending unit 302 is input to an acoustic frame buffer 304. The acoustic frame buffer 304 is typically a random access memory with sufficient capacity to store two full frames of ultrasound data. The memory is divided into two sections, and ultrasound data is written into one section and simultaneously read out from the other section in alternating manner. The output of acoustic frame buffer 304 is supplied to a line averaging unit 306. The output of line averaging unit 306 is supplied to an R-θ scan converter 310. The R-θ scan converter 310 converts the R-θ data from the ultrasound scanner to a raster scan format suitable for display on a video monitor. The R-θ scan converter 310 can, for example, correspond to the R-θ scan converter in the Sonos 1000 ultrasound imaging system manufactured and sold by Hewlett-Packard Company.

Figure 11:
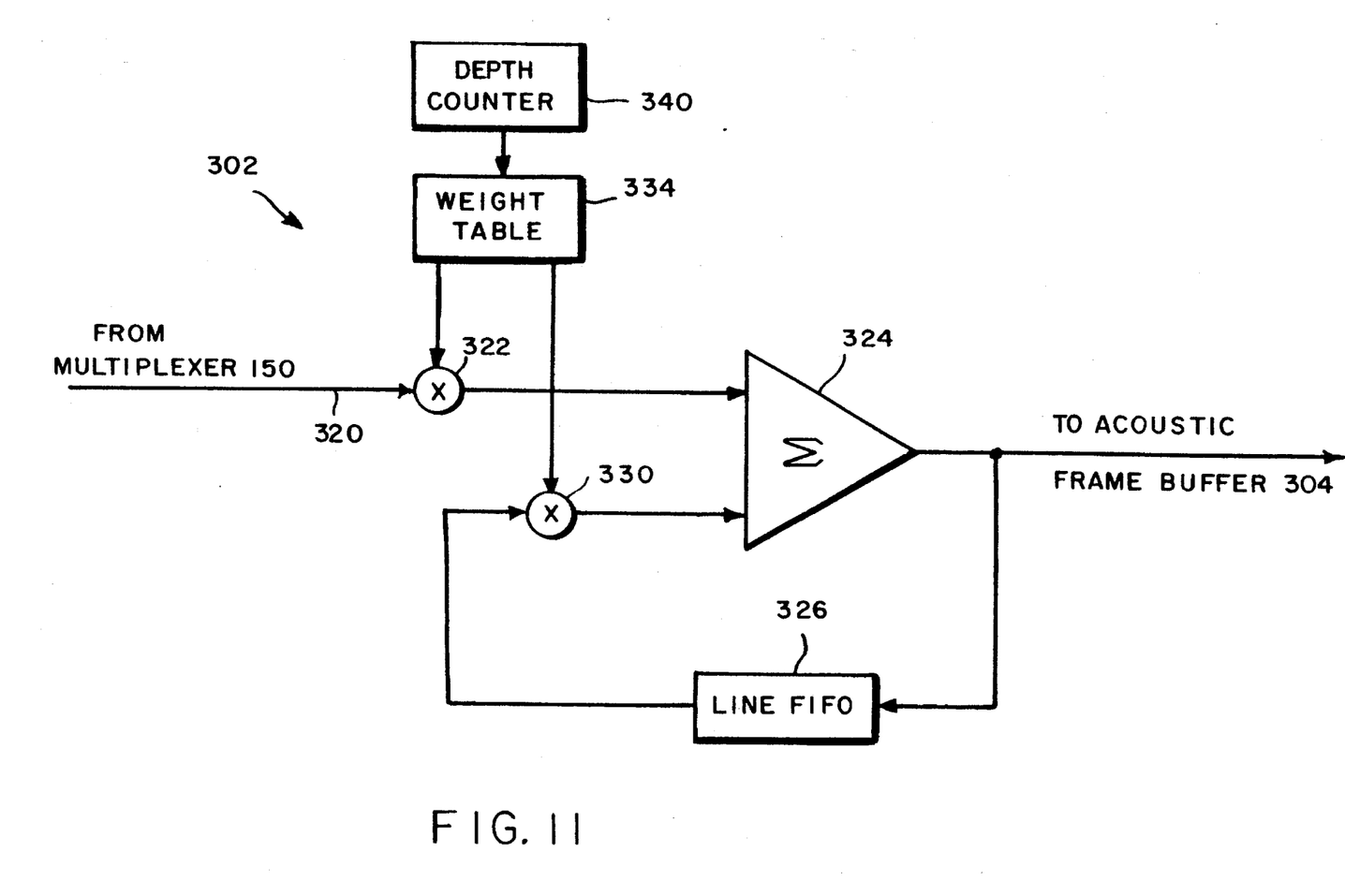
FIG. 11 is a block diagram of the line blending unit shown in FIG. 10.

A block diagram of the line blending unit 302 is shown in FIG. 11. An input 320 from multiplexer 150 is supplied to one input of a multiplier 322. The output of multiplier 322 is supplied to one input of a summing unit 324. The output of summing unit 324 is supplied to the acoustic frame buffer 304 and to a line first-in-first-out (FIFO) memory 326. The output of FIFO memory 326 is supplied to one input of a multiplier 330. The output of multiplier 330 is supplied to a second input of summing unit 324. A weight table 334, such as a RAM or a read-only memory, supplies inputs to multipliers 322 and 330 in accordance with the state of a depth counter 340.

The operation of the line blending unit 302 is described with reference to the timing diagram of receive scan line $R_o$. During this interval, the FIG. 8. During a first time interval, the multiplexer 150 supplies the near field data for receive scan line $R_o$. During this interval, the weight table 334 supplies a weight of 1.0, and the data is stored in the line FIFO memory 326. During a second time interval, the multiplexer 150 supplies the far field data for receive scan line $R_o$ through multiplier 322 with a weight of 1.0. In the transition region near the boundary between the near field and the far field, the weight table 334 supplies weighting factors as shown in Table 1 above so as to blend the near field data and the far field data and avoid image artifacts. This process is repeated by the line blending unit 302 for each scan line in the scan pattern.

Figure 12:
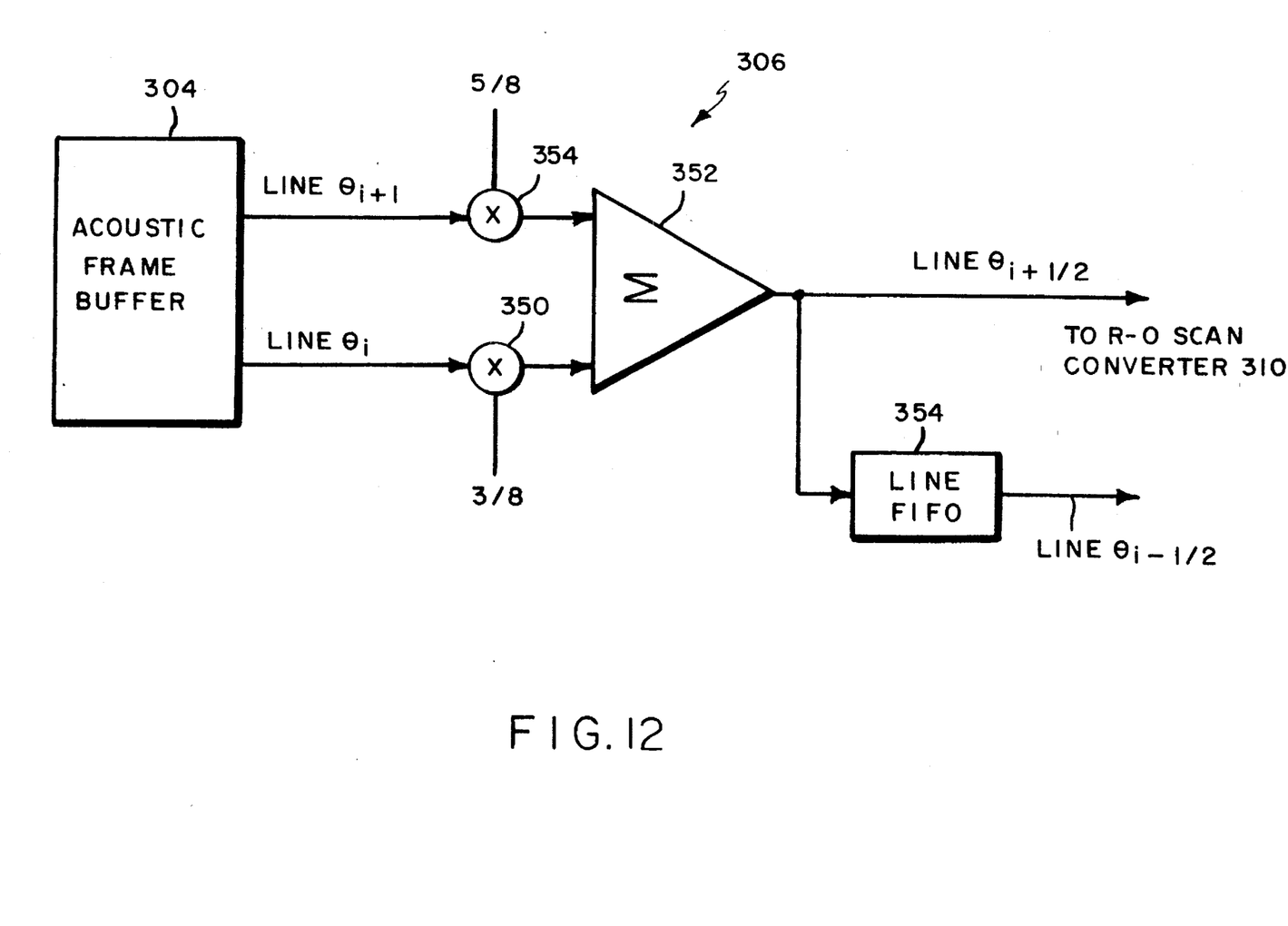
FIG. 12 is a block diagram of the line averaging unit shown in FIG. 10.

A block diagram of the line averaging unit 306 is shown in FIG. 12. The acoustic frame buffer 304 contains data representative of spliced scan lines for two complete ultrasound images. The acoustic frame buffer 304 is configured to simultaneously output data representative of two adjacent spliced scan lines, line $θ_i$ and line $θ_{i+1}$, where i represents a particular spliced scan line in the scan pattern. Thus, with reference to FIG. 5, the acoustic frame buffer 304 first outputs data representative of spliced scan lines $R_o$ and $R_1$. On the next cycle, the acoustic frame buffer 304 outputs data representative of spliced scan lines $R_1$ and $R_2$. This process is repeated for the entire scan pattern. The data for line $θ_i$ is applied to one input of a multiplier 350, which receives a weighting factor of ⅜ at its other input. The output of multiplier 350 is applied to one input of a summing unit 352N The data for line $θ_{i+1}$ is applied to one input of a multiplier 354, which receives a weighting factor of ⅝ at its other input. The output of multiplier 354 is applied to the other input of summing unit 352. The output of summing unit 352 represents the average of line $θ_i$ and line $θ_{i+1}$, with the lines given weighting factors of ⅜ and ⅝, respectively, as described above. The output of summing unit 352 is represented as line $θ_{i+ ½}$ and is applied to the R-θ scan converter 310 (FIG. 10). The R-θ scan converter 310 in the present example is configured to simultaneously receive data representative of two scan lines, because it performs interpolation of the image data. In order to supply averaged data representative of two scan lines simultaneously, the output of summing unit 352 is supplied to a line FIFO memory 354. The output of FIFO 354 is delayed by one line cycle and represents line $θ_{i- ½}$. Thus, line $θ_{i+ ½}$ and line $θ_{i- ½}$ are simultaneously supplied to the R-θ scan converter 310.

While there have been shown and described what are at the present considered the preferred embodiments of the present invention, it will be obvious to those skilled in the art that various changes and modifications may be made therein without departing from the scope of the invention as defined by the appended claims.

What is claimed is:

1. An ultrasound imaging system comprising:

an array of ultrasound transducer elements;

a transmitter for transmitting ultrasound energy into a region of interest with said array at a plurality of steering angles with respect to said array, said transmitter, for each of said steering angles, sequentially transmitting ultrasound energy along a near field transmit scan line and a far field transmit scan line at different focal depths with respect to said array, said ultrasound energy producing ultrasound echoes from the region of interest;

a receiver for receiving signals generated by said array in response to said ultrasound echoes, said receiver including beamforming apparatus for simultaneously receiving signals along first and second near field receive scan lines in response to ultrasound energy transmitted along said near field transmit scan line, and for simultaneously receiving signals along first and second far field receive scan lines in response to ultrasound energy transmitted along said far field transmit scan line, said first near field receive scan line being co-linear with said first far field receive scan line, and said second near field receive scan line being co-linear with said second far field receive scan line, each of said receive scan lines having a receive angle with respect to said array, said receiver further including means for dynamically varying said receive angle during reception of said ultrasound echoes to compensate for spatial variations in the transmitted ultrasound energy such that each of said receive scan lines has a substantially constant effective receive angle;

means for splicing said signals received along said first near field receive scan line and said first far field receive scan line to produce signals representative of a first spliced scan line, and for splicing said signals received along said second near field receive scan line and said second far field receive scan line to produce signals representative of a second spliced scan line, thereby providing signals representative of two spliced scan lines in response to ultrasound energy transmitted along said near field and far field transmit scan lines for each of said steering angles; and a display generator responsive to said signals representative of said spliced scan lines for generating an image of said region of interest.

2. An ultrasound imaging system as defined in claim 1 wherein each of said receive scan lines has a corresponding transmit scan line and wherein said means for dynamically varying said receive angle includes means for steering each of said receive scan lines away from the corresponding transmit scan line near the focal depth of the corresponding transmit scan line.

3. An ultrasound imaging system as defined in claim 1 further including means for weighted averaging of signals representative of adjacent ones of said spliced scan lines to provide averaged scan lines.

4. An ultrasound imaging system as defined in claim 4 wherein said adjacent ones of said spliced scan lines are given relative weights of ⅝ and ⅜, respectively.

5. An ultrasound imaging system as defined in claim 1 wherein said near field and far field receive scan lines are spliced by said splicing means in a transition region and wherein said splicing means includes means for blending said signals received along said near field and far field receive scan lines in said transition region.

6. An ultrasound imaging system as defined in claim 1 wherein said array of ultrasound transducer elements includes at least two selectable elevation apertures, wherein said transmitter includes means for transmitting ultrasound energy along said near field transmit scan line with a first elevation aperture and for transmitting ultrasound energy along said far field transmit scan line with a second elevation aperture larger than said first elevation aperture, and wherein said receiver includes means for receiving signals along said first and second near field receive scan lines with said first elevation aperture and for receiving signals along said first and second far field receive scan lines with said second elevation aperture.

7. An ultrasound imaging system comprising:

an array of ultrasound transducer elements;

a transmitter for transmitting ultrasound energy into a region of interest with said array at a plurality of steering angles with respect to said array, said transmitter, for each of said steering angles, transmitting ultrasound energy along a transmit scan line, said ultrasound energy producing ultrasound echoes from the region of interest;

a receiver for receiving signals generated by said array in response to said ultrasound echoes, said receiver including beamforming apparatus for simultaneously receiving signals along first and second receive scan lines in response to ultrasound energy transmitted along said transmit scan line, each of said receive scan lines having a receive angle with respect to said array, said receiver further including means for dynamically varying said receive angle during reception of said ultrasound echoes to compensate for spatial variations in the transmitted ultrasound energy such that each of said receive scan lines has a substantially constant effective receive angle; and a display generator responsive to signals representative of said receive scan lines for generating an image of said region of interest.

8. An ultrasound imaging system as defined in claim 7 further including means for weighted averaging of signals received along adjacent ones of said receive scan lines to provide averaged scan lines.

9. An ultrasound imaging system as defined in claim 7 wherein each of said receive scan lines has a corresponding transmit scan line and wherein said means for dynamically varying said receive angle includes means for steering each of said receive scan lines away from the corresponding transmit scan line near the focal depth of the corresponding transmit scan line.

10. A method for ultrasound imaging comprising the steps of:

transmitting ultrasound energy into a region of interest with an array of ultrasound transducer elements at a plurality of steering angles with respect to the array, including for each of said steering angles, sequentially transmitting ultrasound energy along a near field transmit scan line and a far field transmit scan line at different focal depths with respect to the array, said ultrasound energy producing ultrasound echos from the region of interest;

simultaneously receiving signals along first and second near field receive scan lines in response to ultrasound energy transmitted along said near field transmit scan line;

simultaneously receiving signals along first and second far field receive scan lines in response to ultrasound energy transmitted along said far field transmit can line, said first near field receive scan line being co-linear with said first far field receive scan line, and said second near field receive scan line being co-linear with said second far field receive scan line, each of said receive scan lines having a receive angle with respect to said array;

dynamically varying said receive angle during reception of ultrasound echos to compensate for spatial variations in the transmitted ultrasound energy such that each of said receive scan lines has a substantially constant effective receive angle;

splicing said signals received along said first near field receive scan line and said first far field receive scan line to produce signals representative of a first spliced scan line;

splicing said signals received along said second near field receive scan line and said second far field receive scan line to produce signals representative of a second spliced scan line, thereby providing signals representative of two spliced scan lines in response to ultrasound energy transmitted along said near field and far field transmit scan lines for each of said steering angles; and generating an image of said region of interest in response to said signals representative of said spliced scan lines.

11. A method as defined in claim 10 further including the step of weighted averaging of the signals representative of adjacent ones of said spliced scan lines to provide averaged scan lines.

12. A method as defined in claim 10 wherein the steps of splicing said signals include weighted blending of said signals received along said near field and far field receive scan lines in a transition region where said near field and far field receive scan lines are spliced together.

13. A method as defined in claim 10 wherein the step of sequentially transmitting ultrasound energy includes transmitting ultrasound energy along said near field transmit scan line with a first elevation aperture and transmitting ultrasound energy along said far field transmit scan line with a second elevation aperture larger than said first elevation aperture.

14. An ultrasound imaging system comprising:

an array of ultrasound transducer elements;

a transmitter for transmitting ultrasound energy into a region of interest with said array at a plurality of steering angles with respect to said array, said transmitter, for each of said steering angles, sequentially transmitting ultrasound energy along a near field transmit scan line and a far field transmit scan line at different focal depths with respect to said array, said ultrasound energy producing ultrasound echoes from the region of interest;

a receiver for receiving signals generated by said array in response to said ultrasound echoes, said receiver including beamforming apparatus for simultaneously receiving signals along first and second near field receive scan lines in response to ultrasound energy transmitted along said near field transmit scan line, and for simultaneously receiving signals along first and second far field receive scan lines in response to ultrasound energy transmitted along said far field transmit scan line, said first near field receive scan line being co-linear with said first far field receive scan line, and said second near field receive scan line being co-linear with said second far field receive scan line;

means for splicing said signals received along said first near field receive scan line and said first far field receive scan line to produce signals representative of a first spliced scan line, and for splicing said signals received along said second near field receive scan line and said second far field receive scan line to produce signals representative of a second spliced scan line, thereby providing signals representative of two spliced scan lines in response to ultrasound energy transmitted along said near field and far field transmit scan lines for each of said steering angles; and a display generator responsive to said signals representative of said spliced scan lines for generating an image of said region of interest.

15. An ultrasound imaging system as defined in claim 14 wherein said array of ultrasound transducer elements includes at least two selectable elevation apertures, wherein said transmitter includes means for transmitting ultrasound energy along said near field transmit scan line with a first elevation aperture and for transmitting ultrasound energy along said far field transmit scan line with a second elevation aperture larger than said first elevation aperture, and wherein said receiver includes means for receiving signals along said first and second near field receive scan lines with said first elevation aperture and for receiving signals along said first and second far field receive scan lines with said second elevation aperture.

* * * * *